US012677313B2

(12) United States Patent
Li et al.

(10) Patent No.: US 12,677,313 B2
(45) Date of Patent: Jul. 7, 2026

(54) SERVICE SCHEDULING METHOD AND APPARATUS

(71) Applicant: HUAWEI TECHNOLOGIES CO., LTD., Shenzhen (CN)

(72) Inventors: Bani Li, Shenzhen (CN); Yanjie Gu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 421 days.

(21) Appl. No.: 18/216,240

(22) Filed: Jun. 29, 2023

(65) Prior Publication Data

US 2023/0345522 A1     Oct. 26, 2023

Related U.S. Application Data

(63) Continuation of application No. PCT/CN2020/142541, filed on Dec. 31, 2020.

(51) Int. Cl.
*H04W 72/566*      (2023.01)
*H04W 72/23*       (2023.01)

(52) U.S. Cl.
CPC ......... *H04W 72/569* (2023.01); *H04W 72/23* (2023.01)

(58) Field of Classification Search
CPC ............... H04W 72/569; H04W 72/23; H04W 72/1221; H04W 84/12
See application file for complete search history.

(56) References Cited

U.S. PATENT DOCUMENTS

2008/0192629 A1*  8/2008  Chari .................. H04L 47/2408
                                              370/230
2009/0313415 A1*  12/2009  Sabaa ................... H04L 67/563
                                              711/6

(Continued)

FOREIGN PATENT DOCUMENTS

CN        104780221 A      7/2015
CN        106789716 A      5/2017

(Continued)

OTHER PUBLICATIONS

IEEE Std 802.1D-2004 IEEE Standard for Local and Metropolitan Area Networks: Media Access Control (MAC) Bridges, Sponsor Lan Man Standards Committee of the IEEE Computer Society, Approved Jun. 4, 2004 American National Standard Institute, total 281 pages.

(Continued)

*Primary Examiner* — Andrew Lee
(74) *Attorney, Agent, or Firm* — WOMBLE BOND DICKINSON (US) LLP

(57) ABSTRACT

A service scheduling method and apparatus are provided, which relate to the field of communication technologies and are applied to a Wi-Fi network system, to resolve a problem that communication delays of a large amount of service data cannot be ensured when a communication channel in the Wi-Fi network system is limited. An example solution includes: a sending node obtains a waiting delay and a category of each data frame in a plurality of data frames at a current moment, determines a service priority of each data frame based on the category of each data frame, and determines, from the plurality of data frames, a target frame that is preferentially sent at the current moment based on the waiting delay, a preset delay, and the service priority of each (Continued)

A sending node obtains a waiting delay and a category of each data frame in a plurality of data frames at a current moment ⟩~ 301

The sending node determines a service priority of each data frame based on the category of each data frame ⟩~ 302

The sending node determines, from the plurality of data frames, a target frame that is preferentially sent at the current moment based on the waiting delay, a preset delay, and the service priority of each data frame ⟩~ 303

The sending node sends the target frame to a receiving node at the current moment ⟩~ 304 data frame; and then the sending node sends the target frame to a receiving node at the current moment.

20 Claims, 10 Drawing Sheets

(56) References Cited

U.S. PATENT DOCUMENTS

| | | | |
|---|---|---|---|
| 2012/0052814 A1* | 3/2012 | Gerber | H04L 69/28 |
| | | | 455/67.11 |
| 2013/0016644 A1* | 1/2013 | Yam | H04W 36/1446 |
| | | | 370/329 |
| 2013/0343398 A1* | 12/2013 | Sarca | H04L 47/32 |
| | | | 370/412 |
| 2016/0309379 A1* | 10/2016 | Pelletier | H04W 76/15 |
| 2017/0195238 A1* | 7/2017 | Luo | H04L 47/2441 |
| 2021/0243772 A1* | 8/2021 | Xu | H04W 72/1273 |
| 2021/0282034 A1* | 9/2021 | Hwang | H04L 1/0036 |
| 2021/0345363 A1* | 11/2021 | Zhang | H04W 72/569 |
| 2023/0127463 A1* | 4/2023 | Kela | H04L 1/08 |
| | | | 455/422.1 |
| 2023/0353294 A1* | 11/2023 | Bontu | H04W 16/02 |

FOREIGN PATENT DOCUMENTS

| | | |
|---|---|---|
| WO | 9909691 A1 | 2/1999 |
| WO | 0237754 A2 | 5/2002 |

OTHER PUBLICATIONS

IEEE Std 802.Nov. 2016 IEEE Standard for Information technology Telecommunications and information exchange between systems Local and metropolitan area networks Specific requirements Part 11: Wireless LAN Medium Access Control (MAC) and Physical Layer (PHY) Specifications, Prepared by the 802.11 Working Group of the LAN/MAN Standards Committeeof the IEEE Computer Society, Approved Dec. 7, 2016 IEEE-SA Standards Board, total 3534 pages.

IEEE P802.11ax™M/D1.1, Feb. 2017, Part 11: Wireless LAN Medium Access Control (MAC) and Physical Layer (PHY) Specifications,Amendment 6: Enhancements for High Efficiency WLAN, total 465 pages.

* cited by examiner

A sending node obtains a waiting delay and a category of each data frame in a plurality of data frames at a current moment ⌐∽ 301

The sending node determines a service priority of each data frame based on the category of each data frame ⌐∽ 302

The sending node determines, from the plurality of data frames, a target frame that is preferentially sent at the current moment based on the waiting delay, a preset delay, and the service priority of each data frame ⌐∽ 303

The sending node sends the target frame to a receiving node at the current moment ⌐∽ 304

FIG. 3

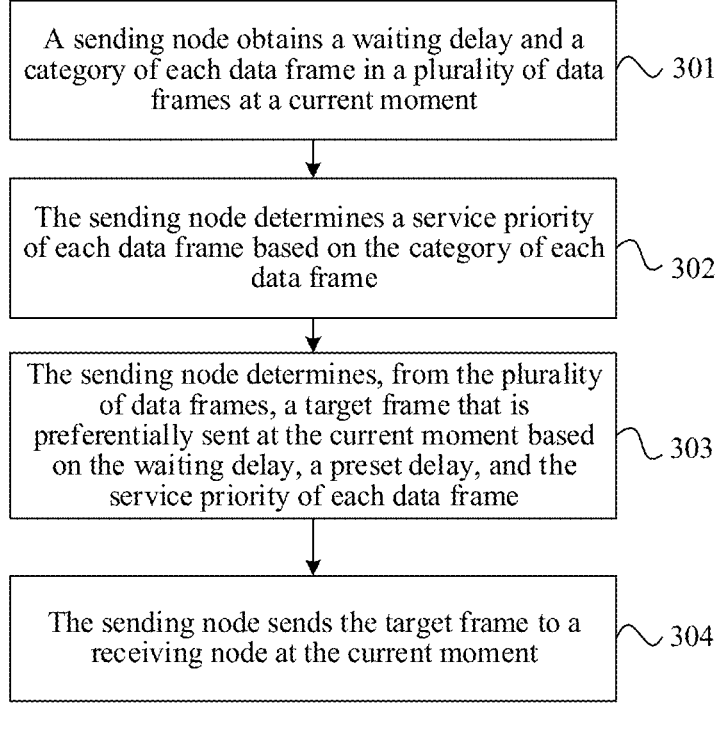

Voice scenario or video scenario

Web page browsing scenario

VR scenario

Game scenario

Small communication delay

Large communication delay 0 ms        10 ms        100 ms        1s

FIG. 4

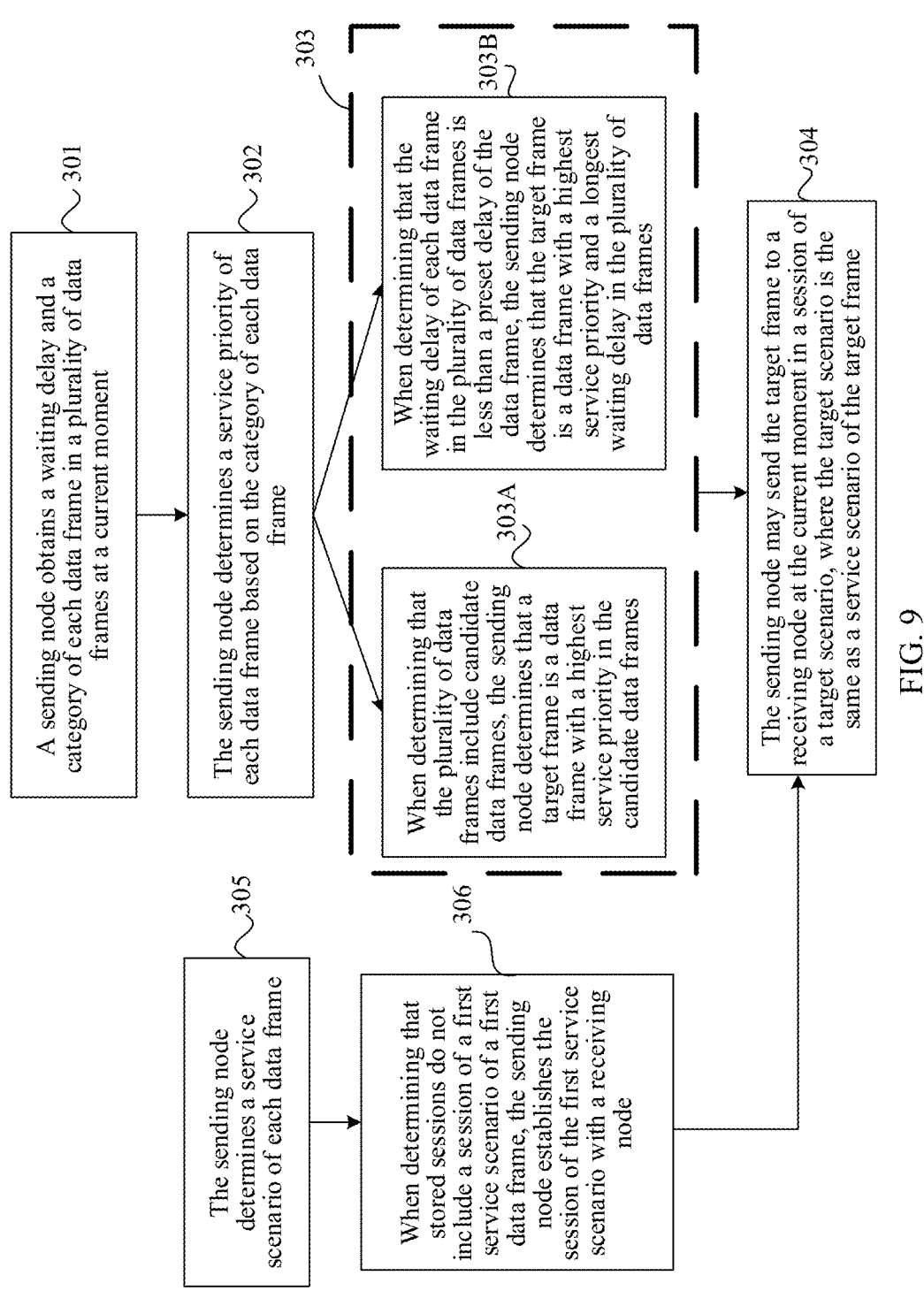

A sending node obtains a waiting delay and a category of each data frame in a plurality of data frames at a current moment ～301

The sending node determines a service priority of each data frame based on the category of each data frame ～302

303

When determining that the plurality of data frames include candidate data frames, the sending node determines that a target frame is a data frame with a highest service priority in the candidate data frames ～303A When determining that the waiting delay of each data frame in the plurality of data frames is less than a preset delay of the data frame, the sending node determines that the target frame is a data frame with a highest service priority and a longest waiting delay in the plurality of data frames ～303B The sending node may send the target frame to a receiving node at the current moment in a session of a target scenario, where the target scenario is the same as a service scenario of the target frame ～304

The sending node determines a service scenario of each data frame ～305

When determining that stored sessions do not include a session of a first service scenario of a first data frame, the sending node establishes the session of the first service scenario with a receiving node ～306

FIG. 9

SERVICE SCHEDULING METHOD AND APPARATUS

CROSS-REFERENCE TO RELATED APPLICATIONS

This application is a continuation of International Application No. PCT/CN2020/142541, filed on Dec. 31, 2020, the disclosure of which is hereby incorporated by reference in its entirety.

TECHNICAL FIELD

This application relates to the field of communication technologies, and in particular, to a service scheduling method and apparatus.

BACKGROUND

In a wireless fidelity (Wi-Fi) network system, a plurality of stations (STAs) may communicate with one access point (AP). In this case, the plurality of STAs share one communication channel.

When a sending node (the sending node is an AP or a STA) needs to send a plurality of pieces of service data, if the foregoing communication channel is interfered (for example, co-channel interference and adjacent-channel interference), or the communication channel is limited because a distance between the AP and the STA becomes longer, the sending node may determine a priority of each piece of service data based on a communication delay of each piece of service data in the plurality of pieces of service data, and send the plurality of pieces of service data in descending order based on determined priorities. In this way, communication delays of the large amount of service data may not be ensured.

SUMMARY

This application provides a service scheduling method and apparatus, to resolve a problem that communication delays of the large amount of service data cannot be ensured when a communication channel in a wireless (e.g., Wi-Fi) network system is limited.

To achieve the foregoing objectives, the following technical solutions are used in this application.

According to a first aspect, this application provides a service scheduling method, applied to a Wi-Fi network system. A sending node obtains a waiting delay and a category of each data frame in a plurality of data frames at a current moment, determines a service priority of each data frame based on the category of each data frame, and determines, from the plurality of data frames, a target frame that is preferentially sent at the current moment based on the waiting delay, a preset delay, and the service priority of each data frame, and then the sending node sends the target frame to a receiving node at the current moment. The waiting delay of the data frame is duration in which the data frame waits for being scheduled by the sending node, the preset delay of the data frame is a preset upper limit value of a waiting delay, and the preset upper limit value of the waiting delay is less than a communication delay of the data frame.

In this way, when determining the target frame that needs to be preferentially sent at the current moment from the plurality of data frames, the sending node not only considers a service priority of the data frame, but also considers a waiting delay and a preset delay of the data frame. The preset delay is a preset upper limit value of a waiting delay, and the upper limit value is less than the communication delay of the data frame. Compared with the conventional technology in which data frames are sent in order of service priorities, in embodiments of this application, a data frame that meets a condition of a waiting delay and a service priority can be fully scheduled, thereby ensuring a communication delay of a larger quantity of data frames.

In an embodiment of this application, the method for "the sending node determines, from the plurality of data frames, a target frame that is preferentially sent at the current moment based on the waiting delay, a preset delay, and the service priority of each data frame" may include: The sending node compares a value relationship between the waiting delay of each data frame and the preset delay of the data frame, and determines the target frame based on a comparison result and the service priority of each data frame.

Whether the data frame meets a waiting delay requirement can be determined by comparing a value relationship between the waiting delay of the data frame and the preset delay of the data frame. With reference to a service priority requirement, data frames that meet the waiting delay requirement and the service priority requirement in different cases are fully scheduled, thereby ensuring a communication delay of these data frames.

In another embodiment of this application, the method for "the sending node determines the target frame based on a comparison result and the service priority of each data frame" may include: When determining that the plurality of data frames include candidate data frames, the sending node determines that the target frame is a data frame with a highest service priority in the candidate data frames. A waiting delay of the candidate data frame is longer than a preset delay of the candidate data frame.

In another embodiment of this application, the method for "the sending node determines the target frame based on a comparison result and the service priority of each data frame" may include: When determining that the waiting delay of each data frame in the plurality of data frames is less than the preset delay of the data frame, the sending node determines that the target frame is a data frame with a highest service priority and a longest waiting delay in the plurality of data frames.

In another embodiment of this application, the method for "the sending node obtains a category of each data frame" may include: The sending node determines the category of each data frame based on a communication delay of each data frame. Communication delays of data frames of one category belong to one preset delay range. Alternatively, the sending node determines a service type of each data frame, and determines a category of each data frame based on the service type of each data frame. Data frames of one category have a same service type.

In another embodiment of this application, the service scheduling method provided in this application may further include the following operations. The sending node determines a service scenario of each data frame. The sending node performs the following operations for the service scenario of each data frame. When determining that stored sessions do not include a session of a first service scenario of a first data frame, the session of the first service scenario with the receiving node is established. The first data frame is any one of the plurality of data frames, and the session of the first service scenario is for the sending node to transmit the data frame of the first service scenario to the receiving node.

In this way, by establishing a session of a service scenario between the sending node and the receiving node, the sending node can track a delay situation of the data frame of the service scenario, to learn a transmission situation of the data frame of the service scenario.

In another embodiment of this application, when the sending node is an access point and the receiving node is a station, the service scheduling method provided in this application may further include the following operations. When determining that the duration in which no data frame of the first service scenario is received is longer than the preset delay of the first data frame in the session of the first service scenario, the sending node sends scheduling information to the receiving node and receives the feedback information from the receiving node. The scheduling information indicates that the receiving node feeds back data information of the first service scenario to the sending node, and the feedback information includes the data frame of the first service scenario.

In this way, the access point sends the scheduling information to the station to perform uplink scheduling, which can alleviate a problem that a delay of sending a data frame to the access point is excessively long because it is difficult for the station to access a channel unilaterally.

In another embodiment of this application, the service scheduling method provided in this application may further include the following operations. The sending node receives the indication information from the receiving node, and after receiving the indication information, restarts timing for the duration in which no data frame of the first service scenario is received. The indication information is sent by the receiving node when determining that duration in which no data frame of the first service scenario is sent is longer than a delay threshold in the session of the first service scenario. A value of the delay threshold is less than the preset delay of the first data frame.

In this way, although sending the scheduling information by the access point to perform uplink scheduling can alleviate the problem that it is difficult for the station to access the channel unilaterally, sending the scheduling information by the access point increases communication overheads. Because the value of the delay threshold for sending the indication information by the station is less than the value of the preset delay for sending the scheduling information by the access point, sending the indication information by the station can reduce a quantity of times that the access point sends the scheduling information, thereby reducing communication overheads.

According to a second aspect, this application provides a service scheduling apparatus, applied to a sending node, and the sending node is applied to a Wi-Fi network system. The apparatus includes: a processor, configured to obtain a waiting delay and a category of each data frame in a plurality of data frames at a current moment, determine a service priority of each data frame based on the category of each data frame, and determine a target frame that is preferentially sent at the current moment from the plurality of data frames based on the waiting delay, a preset delay, and the service priority of each data frame, where the waiting delay of the data frame is duration in which the data frame waits for being scheduled by the processor; the preset delay of the data frame is a preset upper limit value of a waiting delay, and the preset upper limit value of the waiting delay is less than a communication delay of the data frame; and a transmit circuit, configured to send the target frame determined by the processor to the receiving node at the current moment.

In an embodiment of this application, the processor is configured to: compare a value relationship between the waiting delay of each data frame and the preset delay of the data frame; and determine the target frame based on a comparison result and the service priority of each data frame.

In another embodiment of this application, the processor is configured to: when determining that the plurality of data frames include candidate data frames, determine that the target frame is a data frame with a highest service priority in the candidate data frames. A waiting delay of the candidate data frame is longer than a preset delay of the candidate data frame.

In another embodiment of this application, the processor is configured to: when determining that the waiting delay of each data frame in the plurality of data frames is less than the preset delay of the data frame, determine that the target frame is a data frame with a highest service priority and a longest waiting delay in the plurality of data frames.

In another embodiment of this application, the processor is configured to: determine the category of each data frame based on the communication delay of each data frame, where communication delays of data frames of one category belong to one preset delay range; or determine the service type of each data frame, and determine the category of each data frame based on the service type of each data frame. Data frames of one category have a same service type.

In another embodiment of this application, the processor is further configured to: determine a service scenario of each data frame; and perform the following operations for the service scenario of each data frame: when determining that stored sessions do not include a session of a first service scenario of a first data frame, establishing the session of the first service scenario with the receiving node, where the first data frame is any one of the plurality of data frames, and the session of the first service scenario is for transmitting the data frame of the first service scenario with the receiving node.

In another embodiment of this application, when the sending node is an access point, and the receiving node is a station, the service scheduling apparatus further includes a receive circuit. The transmit circuit is further configured to send scheduling information to the receiving node when determining that duration in which no data frame of the first service scenario is received is longer than the preset delay of the first data frame in the session of the first service scenario. The receive circuit is configured to receive the feedback information from the receiving node. The scheduling information indicates that the receiving node feeds back data information of the first service scenario to the transmit circuit. The feedback information includes the data frame of the first service scenario.

In another embodiment of this application, the receive circuit is further configured to receive indication information from the receiving node. The processor is further configured to restart timing for the duration in which no data frame of the first service scenario is received, after receiving the indication information. The indication information is sent by the receiving node when determining that duration in which no data frame of the first service scenario is sent is longer than a delay threshold in the session of the first service scenario. A value of the delay threshold is less than the preset delay of the first data frame.

According to a third aspect, this application provides a service scheduling apparatus, applied to a sending node, and the sending node is applied to a Wi-Fi network system. The apparatus includes an obtaining unit, configured to obtain a waiting delay and a category of each data frame in a plurality of data frames at a current moment; a determining unit, configured to determine the service priority of each data frame based on the category of each data frame obtained by the obtaining unit, and determine, from the plurality of data frames, a target frame that is preferentially sent at the current moment based on the waiting delay, a preset delay, and the service priority of each data frame; and a sending unit, configured to send the target frame determined by the determining unit to a receiving node at the current moment. The waiting delay of the data frame is duration in which the data frame waits for being scheduled by the processor. The preset delay of the data frame is a preset upper limit value of a waiting delay, and the preset upper limit value of a waiting delay is less than a communication delay of the data frame.

In an embodiment of this application, the determining unit is configured to: compare a value relationship between the waiting delay of each data frame and the preset delay of the data frame; and determine the target frame based on a comparison result and the service priority of each data frame.

In another embodiment of this application, the determining unit is configured to: when determining that the plurality of data frames include candidate data frames, determine that the target frame is a data frame with a highest service priority in the candidate data frames. A waiting delay of the candidate data frame is longer than a preset delay of the candidate data frame.

In another embodiment of this application, the determining unit is configured to: when determining that the waiting delay of each data frame in the plurality of data frames is less than the preset delay of the data frame, determine that the target frame is a data frame with a highest service priority and a longest waiting delay in the plurality of data frames.

In another embodiment of this application, the obtaining unit is configured to: determine the category of each data frame based on the communication delay of each data frame, where communication delays of data frames of one category belong to one preset delay range; or determine the service type of each data frame, and determine the category of each data frame based on the service type of each data frame. Data frames of one category have a same service type.

In another embodiment of this application, the service scheduling apparatus further includes an establishment unit. The determining unit is further configured to determine a service scenario of each data frame. For the service scenario of each data frame determined by the determining unit, the establishment unit is configured to establish a session of a first service scenario with the receiving node, when determining that stored sessions do not include a session of the first service scenario of a first data frame. The first data frame is any one of the plurality of data frames, and the session of the first service scenario is for transmitting the data frame of the first service scenario with the receiving node.

In another embodiment of this application, when the sending node is an access point, and the receiving node is a station, the service scheduling apparatus further includes: a receiving unit. The sending unit is further configured to send scheduling information to the receiving node when determining that duration in which no data frame of the first service scenario is received is longer than the preset delay of the first data frame in the session of the first service scenario. The receiving unit is configured to receive the feedback information from the receiving node. The scheduling information indicates that the receiving node feeds back data information of the first service scenario to the transmit circuit. The feedback information includes the data frame of the first service scenario.

In another embodiment of this application, the service scheduling apparatus further includes a timing unit. The receiving unit is further configured to receive indication information from the receiving node. The timing unit is configured to restart timing for the duration in which no data frame of the first service scenario is received, after the receiving unit receives the indication information. The indication information is sent by the receiving node when determining that duration in which no data frame of the first service scenario is sent is longer than a delay threshold in the session of the first service scenario. A value of the delay threshold is less than the preset delay of the first data frame.

According to a fourth aspect, this application provides a service scheduling apparatus. The service scheduling apparatus includes a memory and a processor. The memory is coupled to the processor. The memory is configured to store computer program code, and the computer program code includes computer instructions. When the processor executes the computer instructions, the service scheduling apparatus performs the service scheduling method according to the first aspect and any embodiment of the first aspect.

According to a fifth aspect, this application provides a chip system, and the chip system is applied to a service scheduling apparatus. The chip system includes one or more interface circuits and one or more processors. The interface circuit and the processor are interconnected through lines. The interface circuit is configured to receive a signal from a memory of the service scheduling apparatus, and send a signal to the processor. The signal includes computer instructions stored in the memory. When the processor executes the computer instructions, the service scheduling apparatus performs the service scheduling method according to the first aspect and any embodiment of the first aspect.

According to a sixth aspect, this application provides a computer-readable storage medium. The computer-readable storage medium includes computer instructions. When the computer instructions are run on a service scheduling apparatus, the service scheduling apparatus is enabled to perform the service scheduling method according to the first aspect and any embodiment of the first aspect.

According to a seventh aspect, this application provides a computer program product. The computer program product includes computer instructions. When the computer instructions are run on a service scheduling apparatus, the service scheduling apparatus is enabled to perform the service scheduling method according to the first aspect and any embodiment of the first aspect.

For detailed descriptions of the second aspect to the seventh aspect and the implementations thereof in this application, refer to the detailed descriptions of the first aspect and the implementations of the first aspect. In addition, for beneficial effects of the second aspect to the seventh aspect and the implementations thereof, refer to the analysis of beneficial effects in the first aspect and the implementations of the first aspect. Details are not described herein again.

BRIEF DESCRIPTION OF DRAWINGS

FIG. 3 is a schematic flowchart 1 of a service scheduling method according to an embodiment of this application;

FIG. 4 is a schematic diagram of communication delays of data frames in different service scenarios according to an embodiment of this application;

FIG. 9 is a schematic flowchart 3 of a service scheduling method according to an embodiment of this application;

DESCRIPTION OF EMBODIMENTS

The term "exemplary" or "for example" in embodiments of this application means "used as an example, an illustration, or a description". Any embodiment or design solution described as "exemplary" or "for example" in embodiments of this application should not be interpreted as being more preferred or advantageous than another embodiment or design solution. Exactly, use of the term "exemplary", "for example", or the like is intended to present a related concept in a specific manner.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments of this application, unless otherwise stated, "a plurality of" means two or more than two.

To resolve a problem that communication delays of the large amount of service data cannot be ensured when a communication channel in a Wi-Fi network system is limited, an embodiment of this application provides a service scheduling method. A sending node can determine a target frame that is preferentially sent at a current moment from a plurality of data frames based on a waiting delay, a preset delay, and a service priority of each data frame, and send the target frame to a receiving node at the current moment. Compared with the conventional technology in which data frames are sent in order of service priorities, in this embodiment of this application, a waiting delay and a preset delay of a data frame are considered based on a service priority, so that a data frame that meets a waiting delay requirement and a service priority requirement is fully scheduled, thereby ensuring a communication delay of a larger quantity of data frames.

Figure 1:
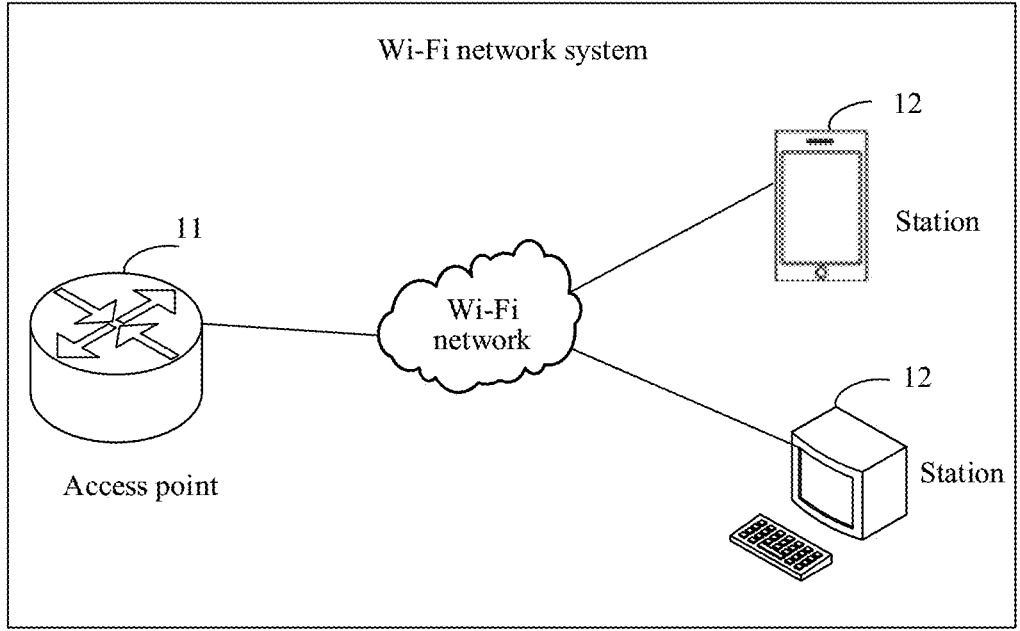
FIG. 1 is a schematic diagram of a structure of a Wi-Fi network system according to an embodiment of this application.

The service scheduling method provided in this embodiment of this application is applicable to a Wi-Fi network system. FIG. 1 shows a structure of the Wi-Fi network system. As shown in FIG. 1, the Wi-Fi network system may include one access point 11 and a plurality of stations 12. The one access point 11 and the plurality of stations 12 establish connections through a Wi-Fi network. The plurality of stations 12 share one communication channel.

An access point 11 may be an AP device. The AP device may be, for example, a wireless router, a wireless gateway, or a wireless bridge.

A station 12 may be a STA device. The STA device may be a mobile terminal device with a Wi-Fi module, for example, a mobile phone (or referred to as a "cellular" phone) and a computer with a mobile terminal device, or may be a portable, pocket-sized, hand-held, computer-built-in, or in-vehicle mobile apparatus, which exchange language and/or data with RAN. For example, a terminal device 12 may be a mobile phone, a tablet computer, a notebook computer, a palmtop computer, a mobile Internet device (MID), a wearable device, a virtual reality (VR) device, an augmented reality (AR) device, a wireless terminal device in industrial control, a wireless terminal device in self-driving, a wireless terminal device in remote medical surgery, a wireless terminal device in a smart grid, a wireless terminal device in transportation safety, a wireless terminal device in a smart city, a wireless terminals in a smart home, and the like.

It should be noted that the service scheduling method provided in this embodiment of this application is performed by a service scheduling apparatus. The service scheduling apparatus may be a sending node, or may be a processor (e.g., a central processing unit (CPU)) of the sending node, or may be a control module configured to schedule a service in the sending node, or may be a client configured to schedule a service in the sending node. The sending node may be the access point 11 or the station 12.

Figure 2:
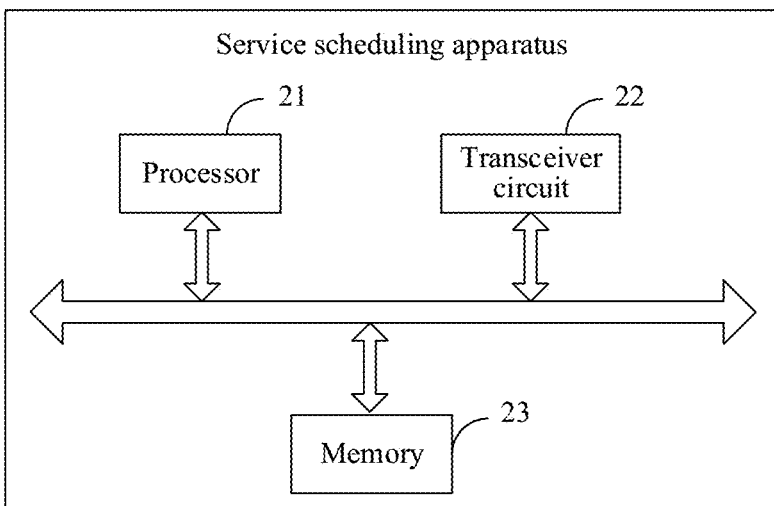
FIG. 2 is a schematic diagram of a structure of a service scheduling apparatus according to an embodiment of this application.

Basic hardware structures of the access point 11 or the station 12 are similar, and both include elements included in the service scheduling apparatus shown in FIG. 2. A hardware structure of the access point 11 or the station 12 is described below using the service scheduling apparatus shown in FIG. 2 as an example.

As shown in FIG. 2, the service scheduling apparatus may include a processor 21 and a transceiver circuit 22. The transceiver circuit 22 may include a transmit circuit and a receive circuit. The processor 21 and the transceiver circuit 22 may be integrated into one chip, or may be two independent chips.

Optionally, the service scheduling apparatus may further include a memory 23 configured to store computer instructions. The processor 21 and the memory 23 are coupled to each other, and are configured to implement the service scheduling method provided in the following embodiments of this application. Alternatively, the service scheduling apparatus may not include the memory 23, and the memory 23 may be located outside the service scheduling apparatus.

The processor 21, the memory 23, and the transceiver circuit 22 are coupled to each other, and are configured to implement the service scheduling method provided in the following embodiments of this application. For example, when the processor 21 executes the computer instructions stored in the memory 23, the service scheduling apparatus is enabled to perform the service scheduling method provided in the following embodiments of this application. For example, the service scheduling apparatus may be a sending node (for example, an access point or a station), or a chip or another component disposed in the sending node.

The transceiver circuit 22 may be implemented by a transceiver component in the sending node. The transceiver component may include an antenna, a feeder, a coder/decoder, and the like.

The processor 21 is a control center of the service scheduling apparatus, and may be a processor, or may be a general term of a plurality of processing elements. For example, the processor 21 may be a CPU, or may be another general-purpose processor, or the like. The general-purpose processor may be a microprocessor, any conventional processor, or the like. For example, the general-purpose processor may be a graphics processing unit (GPU), a digital signal processor (DSP), or the like.

The memory 23 may be a read-only memory (ROM) or another type of static storage device capable of storing static information and instructions, a random access memory (RAM) or another type of dynamic storage device capable of storing information and instructions, an electrically erasable programmable read-only memory (EEPROM), a magnetic disk storage medium or another magnetic storage device, or any other medium capable of carrying or storing expected program code in a form of an instruction or data structure and capable of being accessed by a computer, but is not limited thereto.

In this embodiment of this application, for the access point 11 or the station 12, software programs stored in the memory 23 are different. Therefore, functions implemented by the access point 11 or the station 12 are different. Functions performed by each device are described with reference to the following flowcharts.

The transceiver circuit 22 is configured to connect the service scheduling apparatus to another device by a communication network. The communication network may be a Wi-Fi network or the like. The transceiver circuit 22 may include a receive circuit configured to receive data and a transmit circuit configured to send data.

It should be noted that a structure shown in FIG. 2 does not constitute a limitation on the service scheduling apparatus. In addition to components shown in FIG. 2, the service scheduling apparatus may include more or fewer components than those shown in the figure, or combine some components, or have different component arrangements.

Based on the foregoing descriptions of the Wi-Fi network system and the service scheduling apparatus, an embodiment of this application provides a service scheduling method. The service scheduling method provided in this embodiment of this application is described below with reference to the accompanying drawings. The service scheduling method may be applied to a scenario in which a communication channel is limited in a Wi-Fi network system.

As shown in FIG. 3, the service scheduling method may include the following operation 301 to operation 304. In operation 301 to operation 304, the sending node may be an access point or a station. When the sending node is an access point, the receiving node is a station. When the sending node is a station, the receiving node is an access point.

It should be noted that a communication delay of a data frame in this embodiment of this application includes three parts: a waiting delay that the data frame waits for being scheduled, a processing delay of processing the data frame by the sending node, and a transmission delay of transmitting the data frame from the sending node to the receiving node. A value of the communication delay of the data frame may be preset, and the value is an allowed maximum value.

301: The sending node obtains a waiting delay and a category of each data frame in a plurality of data frames at a current moment.

The sending node may obtain the waiting delay and the category of each data frame in the plurality of data frames that need to be sent at the current moment. The waiting delay of the data frame is duration in which the data frame waits for being scheduled by the sending node. In an implementation, the sending node may start timing using a time at which the data frame is obtained as a start time, and timing duration is the waiting delay. When the data frame is scheduled by the sending node, the timing ends.

In some embodiments, the sending node may obtain the category of each data frame in the following two manners.

Manner 1: The sending node determines the category of each data frame based on a communication delay of each data frame.

Because communication delays of data frames in different service scenarios are different. For example, as shown in FIG. 4, a communication delay of a data frame in a VR scenario is 10 milliseconds (ms), a communication delay of a data frame in a game scenario is between 10 ms and 100 ms, a communication delay of a data frame in a voice scenario or a video scenario is 100 ms, and a communication delay of a data frame in a web page browsing scenario is 1s. Therefore, the sending node may perform classification processing on the plurality of data frames based on communication delays of the data frames, to obtain the category of each data frame.

In an implementation, a plurality of preset delay ranges may be prestored in the sending node. The sending node may determine a preset delay range to which a communication delay of each data frame in the plurality of data frames belongs, and classify data frames corresponding to communication delays that belong to a same preset delay range into one category.

For example, it is assumed that the sending node currently obtains four data frames: a data frame 1, a data frame 2, a data frame 3, and a data frame 4. A communication delay of the data frame 1 is 10 ms, a communication delay of the data frame 2 is 50 ms, a communication delay of the data frame 3 is 70 ms, and a communication delay of the data frame 4 is 150 ms. It is assumed that the sending node prestores four preset delay ranges, which are respectively 0 to 10 ms, 10 ms to 100 ms, 100 ms to 500 ms, and 500 ms to 1s. In this way, the sending node determines that the data frame 1 belongs to the preset delay range of 0 to 10 ms, the data frame 2 and the data frame 3 belong to the preset delay range of 10 ms to 100 ms, and the data frame 4 belongs to the preset delay range of 100 ms to 500 ms. In this way, the sending node classifies the four data frames into three categories. The first category includes the data frame 1, the second category includes the data frame 2 and the data frame 3, and the third category includes the data frame 4.

Manner 2: The sending node determines a service type of each data frame, and determines a category of each data frame based on the service type of each data frame.

Different data frames have different service types, and therefore, the sending node may perform classification processing on the plurality of data frames based on the service types of the data frames, to obtain the category of each data frame.

In an embodiment, the sending node may determine the service type of each data frame based on quality of service (QoS) of each data frame, and classify data frames with a same service type into one category.

For example, it is assumed that the sending node currently obtains four data frames: a data frame 1, a data frame 2, a data frame 3, and a data frame 4. It is assumed that the sending node determines that a service type of the data frame 1 is a voice (VO) type, service types of the data frame 2 and the data frame 3 are both a video (VI) type, and a service type of the data frame 4 is a best effort (BE) type. In this way, the sending node classifies the four data frames into three categories. The first category (VO category) includes the data frame 1, the second category (VI category) includes the data frame 2 and the data frame 3, and the third category (BE category) includes the data frame 4.

It should be noted that in this embodiment of this application, different sending nodes have different obtaining channels for the plurality of data frames. When the sending node is a station, the plurality of data frames may be generated by the station when a user uses some functions in an application installed by the user. For example, when the user uses a voice call function in an instant message (IM) application, the station may generate a voice data frame based on voice input of the user. In another example, when the user uses an online function in a game application, the station may generate a game data frame based on a user operation. When the sending node is an access point, the plurality of data frames may be data frames that are received by the access point and that are from another station and need to be forwarded to the foregoing station.

302: The sending node determines a service priority of each data frame based on the category of each data frame.

After obtaining the category of each data frame, the sending node may determine the service priority of each data frame based on the category of each data frame. Data frames of the same category have a same service priority. When the sending node determines the category of the data frame in different manners, the service priority is also determined in different manners.

If the category of the data frame is determined in the manner 1 in operation 301, the sending node may determine the service priority of the data frame of the category based on a rule that a smaller preset delay range corresponding to the category indicates a higher service priority of the data frame of the category.

For example, with reference to the example in the manner 1, the preset delay range corresponding to the first category is 0 to 10 ms<the preset delay range corresponding to the second category is 10 ms to 100 ms<the preset delay range corresponding to the third category is 100 ms to 500 ms. Therefore, the sending node determines that a service priority of the data frame 1 is higher than service priorities of the data frame 2 and the data frame 3, and the service priorities of the data frame 2 and the data frame 3 are higher than a service priority of the data frame 4.

If the manner 2 in operation 301 is used to determine the category of the data frame, the sending node may determine the service priority of the data frame based on a prestored value relationship between service priorities of different categories.

For example, with reference to the example in the manner 2, it is assumed that the service priority of the VO category prestored in the sending node is higher than the service priority of the VI category, and the service priority of the VI category is higher than a service priority of the BE category. In this way, the sending node determines that the service priority of the data frame 1 is higher than the service priorities of the data frame 2 and the data frame 3, and the service priorities of the data frame 2 and the data frame 3 is higher than a service priority of the data frame 4.

It should be noted that after classifying the plurality of data frames into a plurality of categories, the sending node may add the data frames of each category to a corresponding queue in a scheduling sequence. In this way, the sending node determines the service priority of each queue, that is, determines the service priority of each data frame.

In an embodiment, a plurality of queues may be set in the sending node in advance. For the manner 1, a quantity of queues is set for a quantity of preset delay ranges. In this way, after classification, the sending node may add a data frame corresponding to a communication delay within a preset delay range to a queue corresponding to the preset delay range in a scheduling sequence. For the manner 2, a quantity of queues is set for a quantity of service types. In this way, after classification, the sending node may add a data frame of the same service type to a queue corresponding to the service type in a scheduling sequence.

Figures 5, 6:
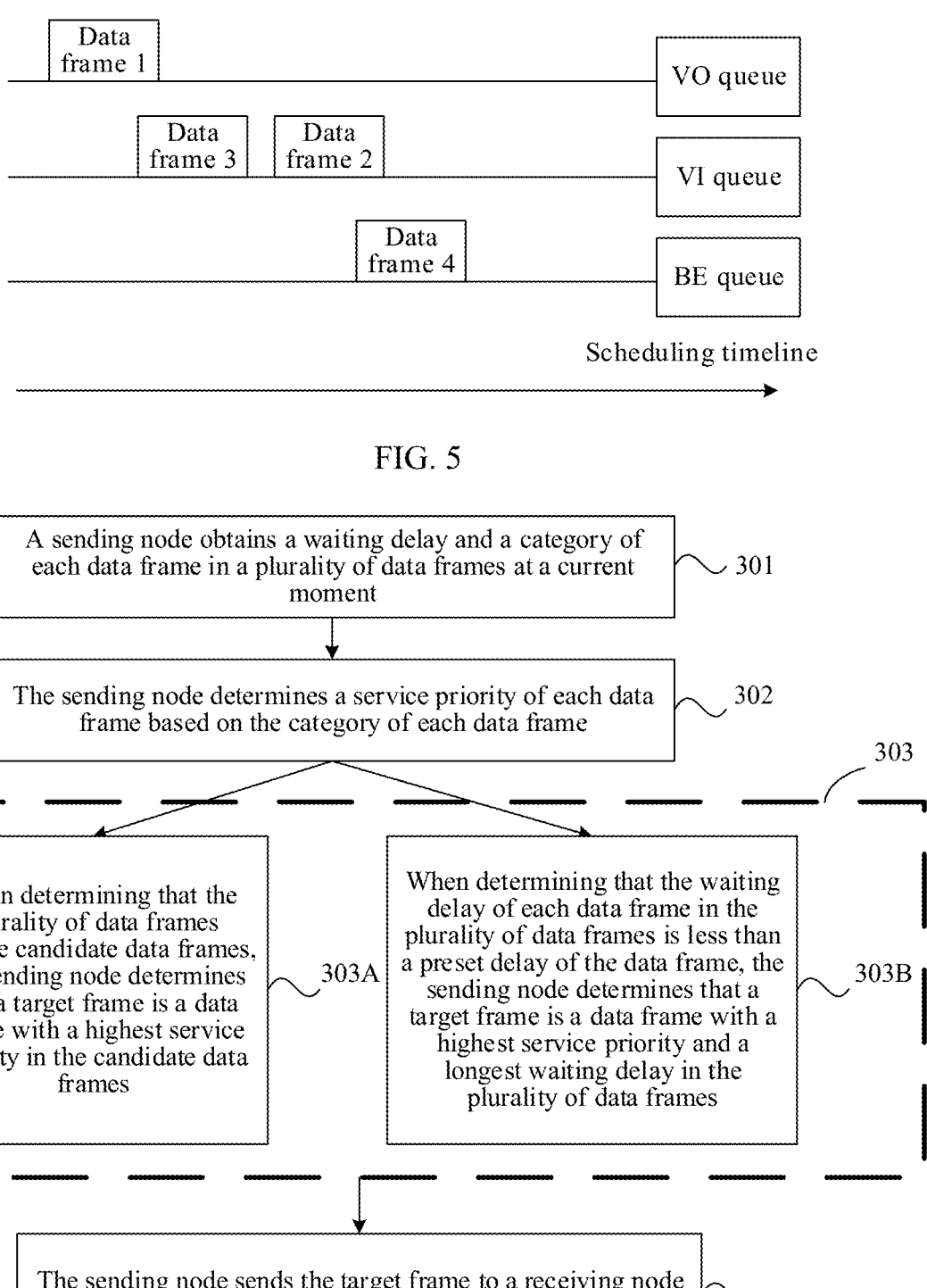
FIG. 5 is a schematic diagram of queues of different service priorities according to an embodiment of this application.
FIG. 6 is a schematic flowchart 2 of a service scheduling method according to an embodiment of this application.

For example, with reference to the example of the manner 2, the sending node classifies the four data frames into three categories. The first category (VO category) includes the data frame 1, the second category (VI category) includes the data frame 2 and the data frame 3, and the third category (BE category) includes the data frame 4. It is assumed that the scheduling sequence of the four data frames is: the data frame 1, the data frame 3, the data frame 2, and the data frame 4, and four queues are preset in the sending node: a VI queue, a VO queue, a BE queue, and a background (BK) queue. FIG. 5 is a schematic diagram in which the sending node adds data frames of three categories to the queue. It can be seen from FIG. 5 that a service priority of a data frame in the VO queue is higher than a service priority of a data frame in the VI queue, and the service priority of a data frame in the VI queue is higher than a service priority of a data frame in the BE queue. Because there is no data frame of a BK type in the four data frames, the BK queue is not shown in FIG. 5.

303: The sending node determines, from the plurality of data frames, a target frame that is preferentially sent at the current moment based on the waiting delay, the preset delay, and the service priority of each data frame.

The preset delay of the data frame is a preset upper limit value of a waiting delay, and the preset upper limit value of the waiting delay is less than a communication delay of the data frame. At the current moment, a scheduling priority of the target frame is higher than that of another data frame in the plurality of data frames.

After obtaining the waiting delay of each data frame and determining the service priority of each data frame, the sending node may compare a value relationship between the waiting delay of each data frame and the preset delay of the data frame, and determine the target frame based on all comparison results and the service priority of the data frame.

It may be understood that when the waiting delay of each data frame in the plurality of data frames is less than the preset delay of the data frame, the target frame may include: a data frame with a highest service priority and a longest waiting delay in the plurality of data frames. Alternatively, when the waiting delay of the data frame in the plurality of data frames is longer than the preset delay of the data frame, the target frame may include: a data frame with a highest service priority in data frames whose waiting delays are longer than preset delays.

304: The sending node sends the target frame to the receiving node at the current moment.

It should be noted that in this embodiment of this application, after performing operation 301 to operation 304, the sending node may repeatedly perform operation 301 to operation 304 at a next moment of the current moment. That is, the sending node obtains a waiting delay and a category of a data frame in a plurality of data frames at the next moment (the plurality of data frames may include a remaining data frame in the data frames obtained at the current moment other than the target frame, and may also include a data frame newly generated at the next moment), determines a service priority of the data frame based on the category of the data frame, determines, based on the waiting delay, a preset delay, and the service priority of the data frame, a target frame that is preferentially sent at the next moment, and sends the re-determined target frame to the receiving node at the next moment. Repeat the foregoing operations until the sending node does not have a to-be-sent data frame.

According to the service scheduling method provided in this embodiment of this application, after obtaining the waiting delay and the category of each data frame in the plurality of data frames, the sending node determines the service priority of each data frame based on the category of each data frame, and determines, from the plurality of data frames, the target frame that is preferentially sent at the current moment, based on the waiting delay, the preset delay, and the service priority of each data frame. Then, the sending node sends the determined target frame to the receiving node at the current moment. In this way, when determining the target frame that needs to be preferentially sent at the current moment from the plurality of data frames, the sending node not only considers a service priority of the data frame, but also considers a waiting delay and a preset delay of the data frame. The preset delay is a preset upper limit value of a waiting delay, and the upper limit value is less than the communication delay of the data frame. Compared with the conventional technology in which data frames are sent in order of service priorities, in embodiments of this application, a data frame that meets a condition of a waiting delay and a service priority can be fully scheduled, thereby ensuring a communication delay of a larger quantity of data frames.

In this embodiment of this application, based on FIG. 3, as shown in FIG. 6, operation 303 may include the following operation 303A or 303B.

303A: When determining that the plurality of data frames include candidate data frames, the sending node determines that the target frame is a data frame with a highest service priority in the candidate data frames.

The waiting delay of the candidate data frame is longer than or equal to the preset delay of the candidate data frame.

When the candidate data frame includes one or more data frames of a same service priority, the sending node may determine that the target frame is the candidate data frame.

When the candidate data frame includes a plurality of data frames of different service priorities, the sending node may determine that the target frame is a data frame with a highest service priority in the candidate data frames.

It should be noted that in this embodiment of this application, because a quantity of data frames sent by the sending node at the current moment is limited, when the sending node determines the target frame, if a quantity of data frames with a highest service priority in the candidate data frames is longer than a maximum quantity of data frames that are allowed to be sent at a time, the sending node may determine that the target frame is data frames in the candidate data frames that are of a highest service priority, that are first scheduled, and that are of a maximum quantity allowed to be sent.

For example, with reference to FIG. 5, it is assumed that a maximum quantity of data frames allowed to be sent by the sending node at a time is eight.

Figure 7:
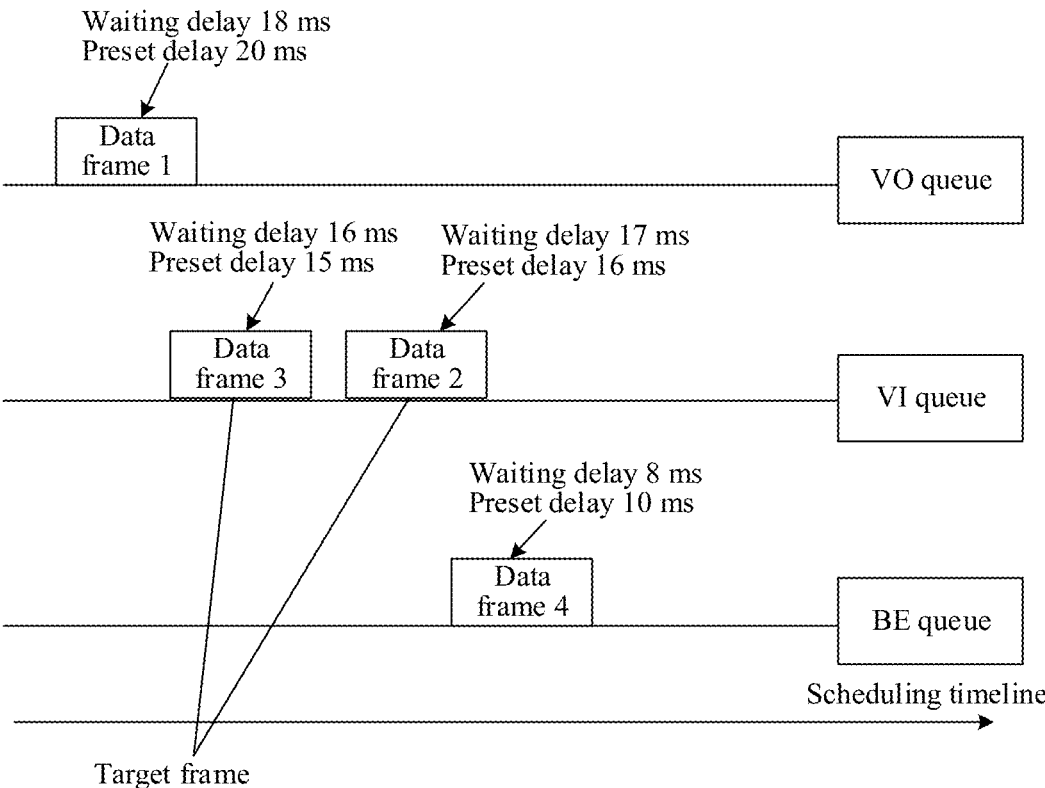
FIG. 7 is a schematic diagram 1 of a scenario of determining a target frame according to an embodiment of this application.

As shown in FIG. 7, it is assumed that a waiting delay of the data frame 1 obtained by the sending node is 18 ms, a waiting delay of the data frame 2 is 16 ms, a waiting delay of the data frame 3 is 17 ms, and a waiting delay of the data frame 4 is 8 ms.

It is assumed that the preset delay of the data frame 1 is 20 ms (the communication delay of the data frame 1 is 100 ms), the preset delay of the data frame 2 is 15 ms (the communication delay of the data frame 2 is 95 ms), the preset delay of the data frame 3 is 16 ms (the communication delay of the data frame 3 is 96 ms), and the preset delay of the data frame 4 is 10 ms (the communication delay of the data frame 4 is 50 ms). In this way, the sending node determines that the waiting delay 16 ms of the data frame 2 is longer than the preset delay 15 ms of the data frame 2, and that the waiting delay 17 ms of the data frame 3 is longer than the preset delay 16 ms of the data frame 3. That is, the sending node determines that the data frame 2 and the data frame 3 are candidate data frames. Because both the data frame 2 and the data frame 3 are in the VI queue, the sending node determines that the target frames are the data frame 2 and the data frame 3.

Figure 8:
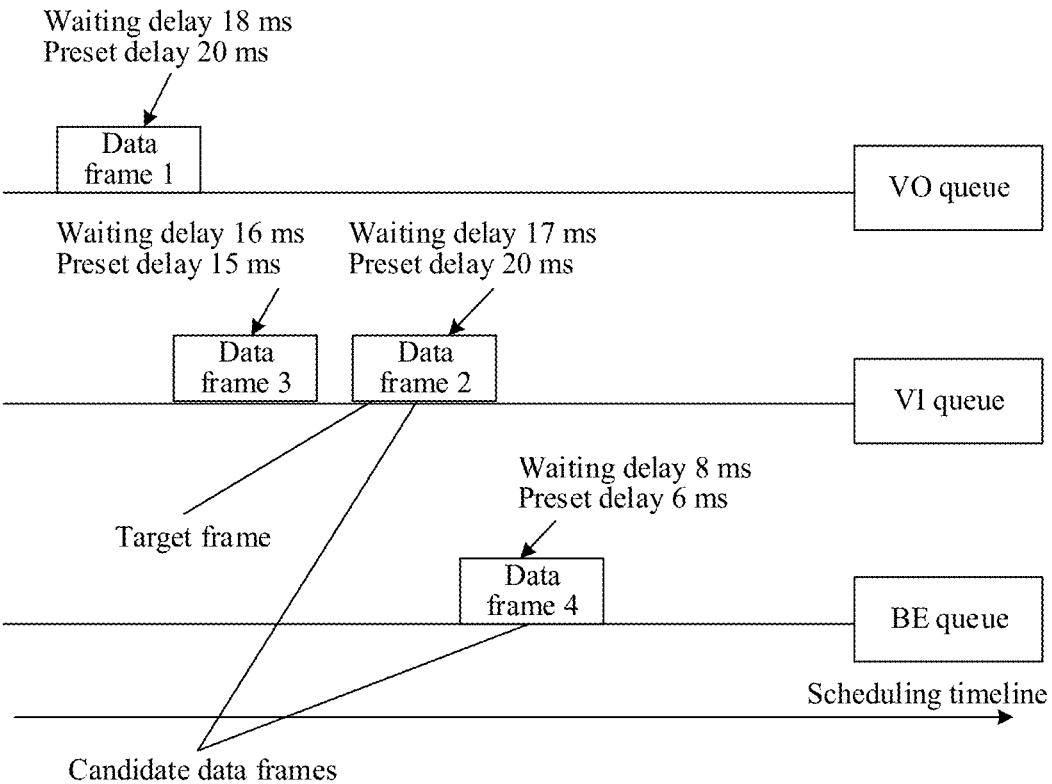
FIG. 8 is a schematic diagram 2 of a scenario of determining a target frame according to an embodiment of this application.

As shown in FIG. 8, it is assumed that the waiting delay of the data frame 1 obtained by the sending node is 18 ms, the waiting delay of the data frame 2 is 16 ms, the waiting delay of the data frame 3 is 17 ms, and the waiting delay of the data frame 4 is 8 ms.

It is assumed that the preset delay of the data frame 1 is 20 ms (the communication delay of the data frame 1 is 100 ms), the preset delay of the data frame 2 is 15 ms (the communication delay of the data frame 2 is 95 ms), the preset delay of the data frame 3 is 20 ms (the communication delay of the data frame 3 is 100 ms), and the preset delay of the data frame 4 is 6 ms (the communication delay of the data frame 4 is 50 ms). In this way, the sending node determines that the waiting delay 16 ms of the data frame 2 is longer than the preset delay 15 ms of the data frame 2, and that the waiting delay 8 ms of the data frame 4 is longer than the preset delay 6 ms of the data frame 4. That is, the sending node determines that the data frame 2 and the data frame 4 are candidate data frames. Because the data frame 2 is in the VI queue, and the data frame 4 is in the BE queue, the service priority of the data frame in the VI queue is higher than the service priority of the data frame in the BE queue, the sending node determines that the target frame is the data frame 2.

303B: When determining that the waiting delay of each data frame in the plurality of data frames is less than the preset delay of the data frame, the sending node determines that the target frame is a data frame with a highest service priority and a longest waiting delay in the plurality of data frames.

It should be noted that in an embodiment of this application, because a quantity of data frames sent by the sending node at the current moment is limited, when the sending node determines the target frame, if a quantity of data frames with a highest service priority and a longest waiting delay is longer than a maximum quantity of data frames that are allowed to be sent at a time, the sending node may determine that the target frame is data frames in the candidate data frames that are of a highest service priority, that are of a longest waiting delay, that are first scheduled, and that are of a maximum quantity allowed to be sent.

In this way, when determining that the waiting delay of the candidate data frame is longer than or equal to the preset delay of the candidate data frame, the sending node can preferentially schedule a data frame with a highest service priority in the candidate data frames. In addition, a data frame with a highest service priority is preferentially scheduled only when determining that waiting delays of all data frames are less than preset delays. With reference to a waiting delay requirement and the service priority requirement, data frames that meet the waiting delay requirement and the service priority requirement in different cases are fully scheduled, thereby ensuring a communication delay of these data frames.

In this embodiment of this application, based on FIG. 6, as shown in FIG. 9, before the sending node performs operation 304, the service scheduling method provided in this embodiment of this application may further include the following operation 305 and operation 306.

305: The sending node determines a service scenario of each data frame.

For example, with reference to FIG. 5, if the data frame 1 is generated when the user makes a voice call, the service scenario of the data frame 1 is a voice scenario 1. If the data frame 4 is generated when the user performs an operation in a game application A, the service scenario of the data frame 4 is a game scenario 1.

306: When determining that the stored session does not include the session of the first service scenario of the first data frame, the sending node establishes the session of the first service scenario with the receiving node.

After determining the service scenario of each data frame, the sending node may determine, based on the service scenario of each data frame, whether to establish a session of the service scenario. Whether to establish the session of the first service scenario of the first data frame is used as an example for description herein. The first data frame is any one of the plurality of data frames.

When determining that the session stored by the sending node does not include the session of the first service scenario, the sending node may establish the session of the first service scenario with the receiving node. When determining that the session stored by the sending node includes the session of the first service scenario, the sending node does not establish the session of the first service scenario. The session of the first service scenario is for the sending node to transmit the data frame of the first service scenario to the receiving node.

It may be understood that when sending the data frame, the sending node may also receive the data frame sent by the receiving node. Therefore, the session stored by the sending node may be established when a data frame is sent, or may be established when a data frame is received. For the received data frame, detailed descriptions that the sending node determines whether to establish the session of the service scenario of each data frame is similar to the related descriptions of whether to establish the session of the service scenario of the sent data frame, and details are not described herein again.

It should be noted that in this embodiment of this application, after the sending node establishes the session, that the sending node sends the target frame to the receiving node at the current moment in operation 304 may include the following operation: The sending node may send the target frame to the receiving node at the current moment in the session of a target scenario. The target scenario is the same as the service scenario of the target frame.

In addition, in this embodiment of this application, there may be a plurality of implementations for determining whether to establish the session of the service scenario of the data frame. In an implementation, when obtaining each data frame, the sending node may determine whether to establish the session of the service scenario of the data frame. In another implementation, after determining the target frame and before sending the target frame, the sending node may determine whether to establish the session of the service scenario of the target frame. When to determine whether to establish a session is not limited in this embodiment of this application.

In this way, by establishing a session of a service scenario between the sending node and the receiving node, the sending node can track a delay situation of the data frame of the service scenario, to learn a transmission situation of the data frame of the service scenario.

Figure 10:
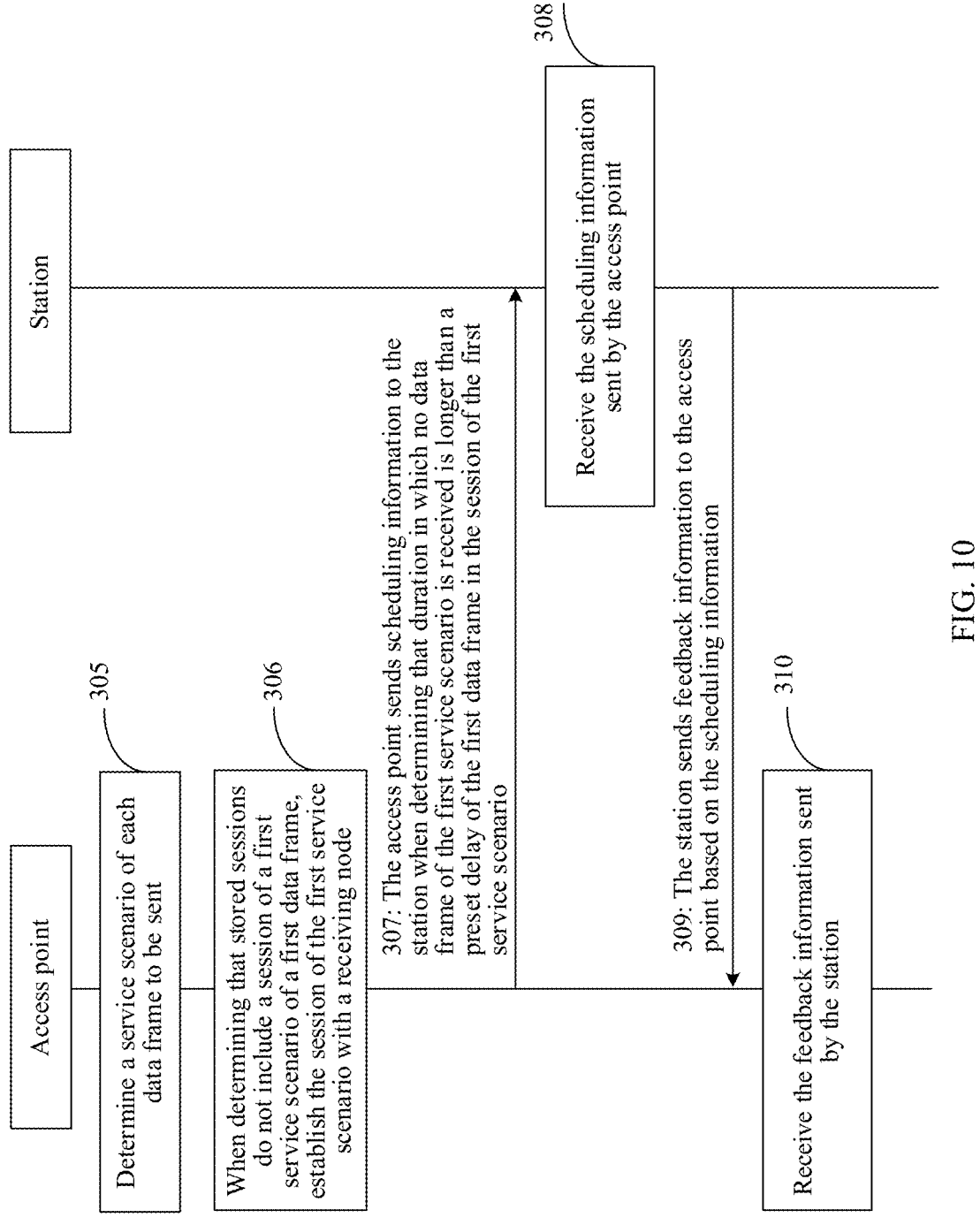
FIG. 10 is a schematic flowchart 4 of a service scheduling method according to an embodiment of this application.

In an embodiment of this application, when the sending node is an access point, and the receiving node is a station, based on FIG. 9, as shown in FIG. 10, the service scheduling method provided in this embodiment of this application may further include the following operation 307 to operation 310.

307: The access point sends scheduling information to the station when determining that duration in which no data frame of the first service scenario is received is longer than a preset delay of the first data frame in the session of the first service scenario.

After establishing the session of the first service scenario, the access point may receive or send the data frame of the first service scenario in the session of the first service scenario. Each time a data frame of the first service scenario is received, the access point may start timing, and compare timing duration with the preset delay of the first data frame. If the access point receives the data frame of the first service scenario again when the timing duration is less than the preset delay, the access point restarts timing. If the timing duration is longer than or equal to the preset delay, the access point still does not receive the data frame of the first service scenario, that is, the duration in which the data frame of the first service scenario is not received is longer than the preset delay, the access point may send the scheduling information to the station. The scheduling information indicates that the station feeds back data information of the first service scenario to the access point. In some embodiments, the scheduling information may be a trigger frame.

308: The station receives the scheduling information sent by the access point.

309: The station sends feedback information to the access point based on the scheduling information.

After receiving the scheduling information sent by the access point, the station may send corresponding feedback information to the access point based on a situation of the station. If the station determines that duration in which no data frame of the first service scenario is sent in the session of the first service scenario is longer than the preset delay, the feedback information sent by the station indicates that no data frame of the first service scenario is sent. If the station determines that the duration in which no data frame of the first service scenario is sent in the session of the first service scenario is less than or equal to the preset delay, and the data frame of the first service scenario is not successfully sent only because the communication channel is limited, the station sends the feedback information to the access point. The feedback information includes the data frame of the first service scenario that is not successfully sent.

310: The access point receives the feedback information sent by the station.

In addition, the access point may delete the session of the service scenario when ending the service scenario. For example, the access point may delete a session of a voice scenario when a voice call drop is hung up. In this way, a problem of relatively large communication overheads caused by continuous uplink scheduling of the access point can be avoided.

Figure 11:
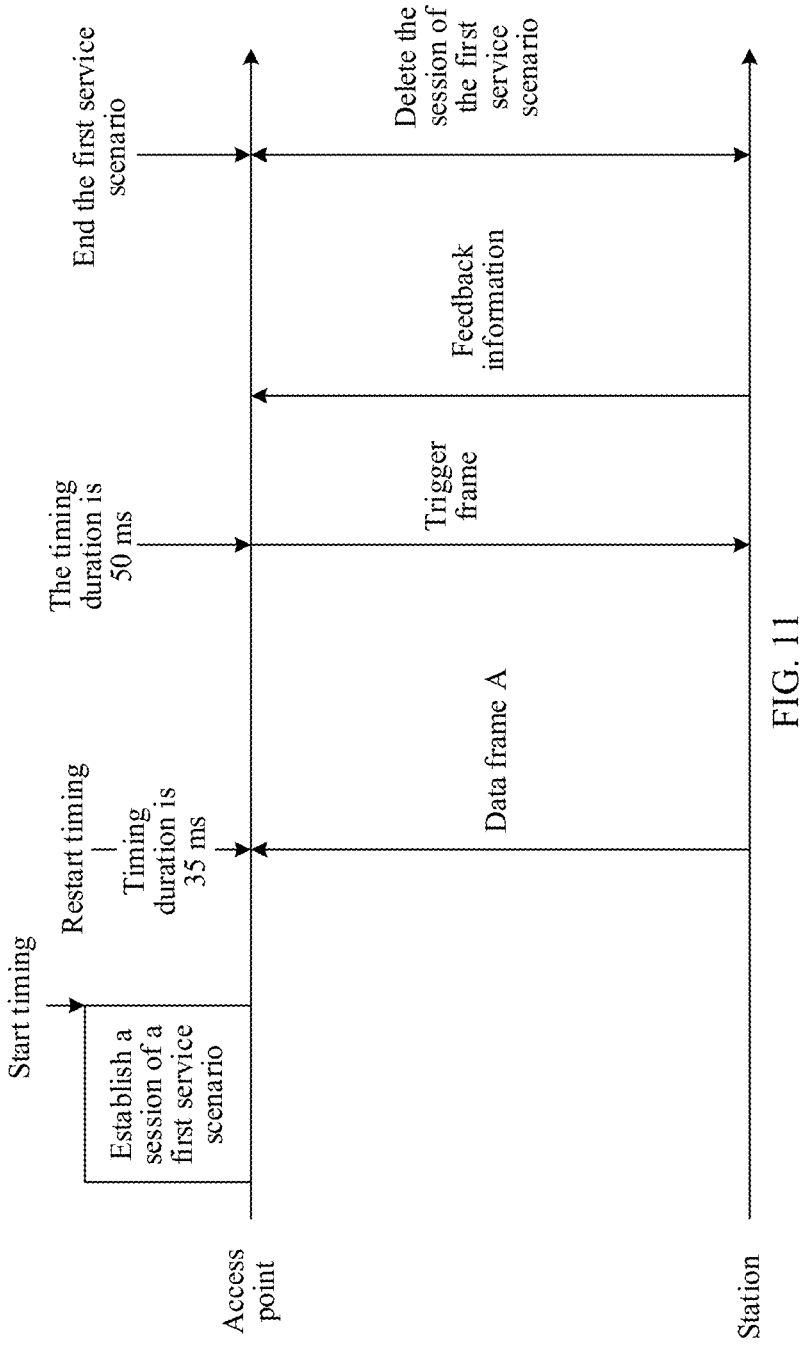
FIG. 11 is a schematic diagram of uplink scheduling of an access point according to an embodiment of this application.

For example, as shown in FIG. 11, after obtaining the first data frame, the access point determines that the session stored in the access point does not include the session of the first service scenario of the first data frame, and establishes the session of the first service scenario between the access point and the station. The access point starts timing when establishing the session of the first service scenario. It is assumed that the preset delay of the first data frame is 50 ms. If the access point receives, when timing duration is 35 ms, a data frame A of the first service scenario from the station in the session of the first service scenario, the access point restarts timing. Then, if the access point still does not receive the data frame of the first service scenario when the timing duration is 50 ms, the access point sends the trigger frame to the station, and receives the feedback information sent by the station. Then, when determining to end the first service scenario, the access point deletes the session of the first service scenario.

In this way, the access point sends the scheduling information to the station to perform uplink scheduling, which can alleviate a problem that a delay of sending a data frame to the access point is excessively long because it is difficult for the station to access a channel unilaterally. In addition, the access point increases a channel access opportunity in an uplink scheduling manner, comparing with adjusting an enhanced distributed channel access (EDCA) parameter, adjusting a clear channel assessment (CCA) threshold, opening a transmission opportunity (TXOP), or the like to increase an opportunity of accessing a channel, utilization of a communication channel can be improved in this embodiment of this application.

Figure 12:
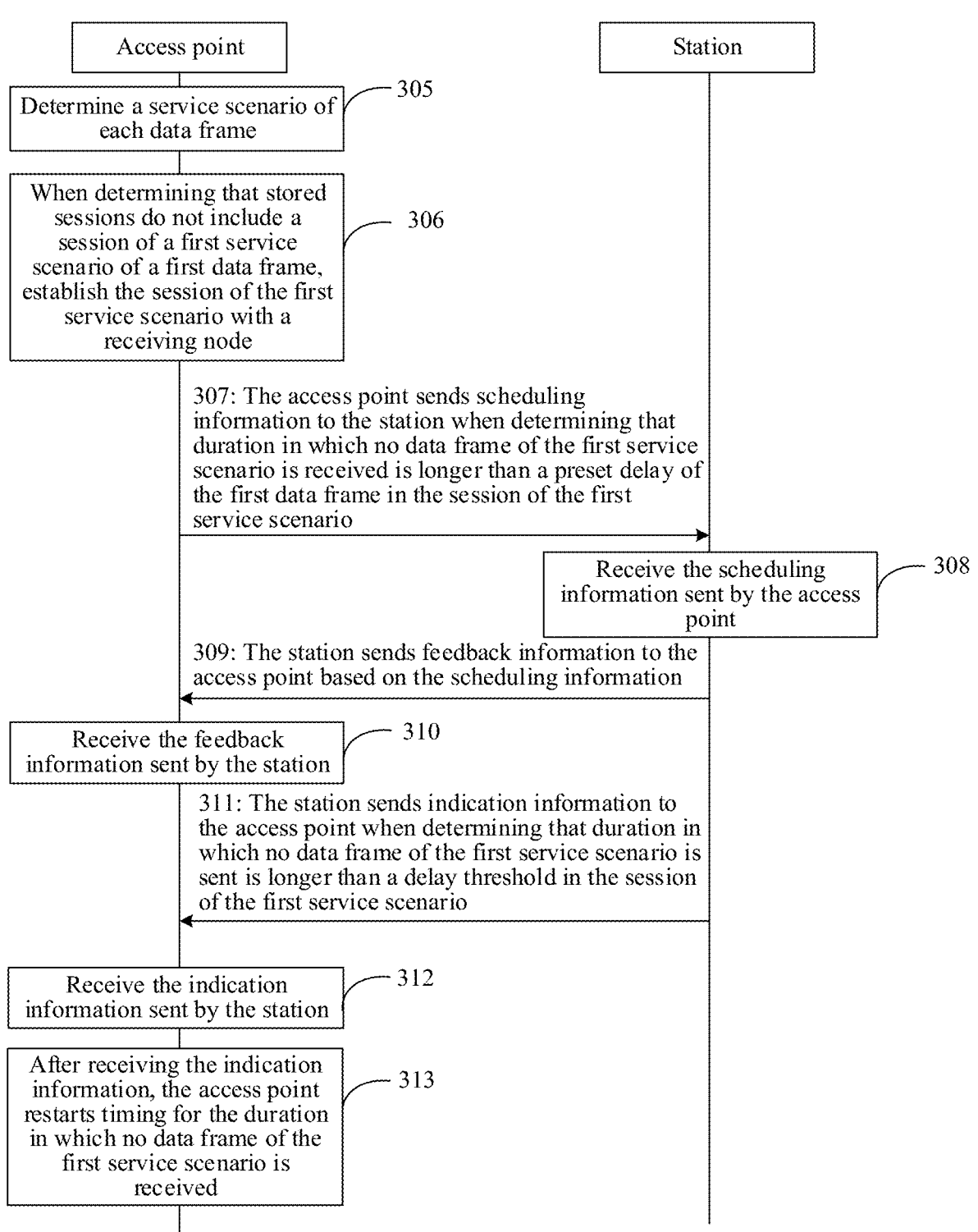
FIG. 12 is a schematic flowchart 5 of a service scheduling method according to an embodiment of this application.

In this embodiment of this application, based on FIG. 10, as shown in FIG. 12, the service scheduling method provided in this embodiment of this application may further include the following operation 311 to operation 313.

311: The station sends the indication information to the access point when determining that the duration in which no data frame of the first service scenario is sent in the session of the first service scenario is longer than a delay threshold.

A value of the delay threshold is less than the preset delay of the first data frame.

The station starts timing when establishing the session of the first service scenario, and if the station sends the data frame of the first service scenario in the session of the first service scenario when the timing duration is less than the delay threshold, the station restarts timing. If the station still does not send the data frame of the first service scenario in the session of the first service scenario when the timing duration is longer than or equal to the delay threshold, the station sends the indication information to the access point. The indication information indicates that the station does not send the data frame of the first service scenario within duration of the delay threshold.

312: The access point receives the indication information sent by the station.

313. After receiving the indication information, the access point restarts timing for the duration in which no data frame of the first service scenario is received.

In this way, although sending the scheduling information by the access point to perform uplink scheduling can alleviate the problem that it is difficult for the station to access the channel unilaterally, sending the scheduling information by the access point increases communication overheads. Because the value of the delay threshold for sending the indication information by the station is less than the value of the preset delay for sending the scheduling information by the access point, sending the indication information by the station can reduce a quantity of times that the access point sends the scheduling information, thereby reducing communication overheads.

The foregoing mainly describes the solutions provided in embodiments of this application from a perspective of a method. To implement the foregoing functions, the device includes a corresponding hardware structure and/or a corresponding software module for performing each function. A person skilled in the art should easily be aware that, in combination with algorithms and operations in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 13:
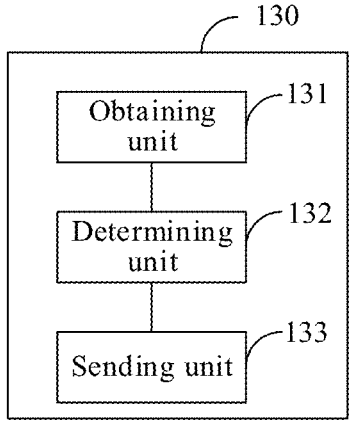
FIG. 13 is a schematic diagram 1 of a service scheduling apparatus according to an embodiment of this application.

FIG. 13 is a schematic diagram of a structure of a service scheduling apparatus 130 according to an embodiment of this application. The service scheduling apparatus 130 may be an access point or a station, or may be a CPU in an access point or a station, or may be a control module in an access point or a station, or may be a client in an access point or a station. The service scheduling apparatus 130 is configured to perform the service scheduling method shown in any one of FIG. 3, FIG. 6, FIG. 9, FIG. 10, and FIG. 12. The service scheduling apparatus 130 may include an obtaining unit 131, a determining unit 132, and a sending unit 133.

The obtaining unit 131 is configured to obtain a waiting delay and a category of each data frame in a plurality of data frames at a current moment. For example, with reference to FIG. 3, the obtaining unit 131 may be configured to perform operation 301. The determining unit 132 is configured to determine a service priority of each data frame based on the category of each data frame obtained by the obtaining unit, and determine, from the plurality of data frames, a target frame that is preferentially sent at the current moment based on the waiting delay, a preset delay, and the service priority of each data frame. For example, with reference to FIG. 3, the determining unit 132 may be configured to perform operation 302 and operation 303. The sending unit 133 is configured to send the target frame determined by the determining unit to the receiving node at the current moment. For example, with reference to FIG. 3, the sending unit 133 may be configured to perform operation 304.

In an embodiment, the determining unit 132 is configured to: compare a value relationship between the waiting delay of each data frame and the preset delay of the data frame; and determine the target frame based on a comparison result and the service priority of each data frame.

In an embodiment, the determining unit 132 is configured to: when determining that the plurality of data frames include candidate data frames, determine that the target frame is a data frame with a highest service priority in the candidate data frames. A waiting delay of the candidate data frame is longer than a preset delay of the candidate data frame. For example, with reference to FIG. 6, the determining unit 132 may be configured to perform operation 303A.

In an embodiment, the determining unit 132 is configured to: when determining that the waiting delay of each data frame in the plurality of data frames is less than the preset delay of the data frame, determine that the target frame is a data frame with a highest service priority and a longest waiting delay in the plurality of data frames. For example, with reference to FIG. 6, the determining unit 132 may be configured to perform operation 303B.

In an embodiment, the obtaining unit 131 is configured to: determine the category of each data frame based on the communication delay of each data frame, where communication delays of data frames of one category belong to one preset delay range; or determine the service type of each data frame, and determine the category of each data frame based on the service type of each data frame. Data frames of one category have a same service type.

Figure 14:
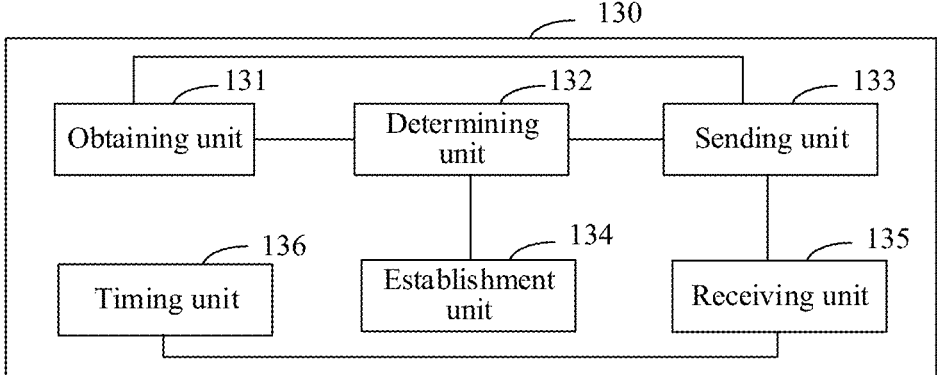
FIG. 14 is a schematic diagram 2 of a service scheduling apparatus according to an embodiment of this application.

In an embodiment, as shown in FIG. 14, the service scheduling apparatus 130 further includes: an establishment unit 134. The determining unit 132 is further configured to determine a service scenario of each data frame. For example, with reference to FIG. 9, the determining unit 132 may further be configured to perform operation 305. The establishment unit 134 is configured to, when determining that the stored session does not include the session of a first service scenario of a first data frame, establish the session of the first service scenario with the receiving node. For example, with reference to FIG. 9, the establishment unit 134 may further be configured to perform operation 306.

In an embodiment, as shown in FIG. 14, when the sending node is an access point, and the receiving node is a station, the service scheduling apparatus 130 further includes: a receiving unit 135. The sending unit 133 is further configured to send scheduling information to the receiving node when determining that duration in which no data frame of the first service scenario is received is longer than the preset delay of the first data frame in the session of the first service scenario. For example, with reference to FIG. 10, the sending unit 133 may further be configured to perform operation 307. The receiving unit 135 is configured to receive the feedback information from the receiving node. For example, with reference to FIG. 10, the receiving unit 135 may further be configured to perform operation 310.

In an embodiment, as shown in FIG. 14, the service scheduling apparatus 130 further includes: a timing unit 136. The receiving unit 135 is further configured to receive indication information from the receiving node. For example, with reference to FIG. 12, the receiving unit 135 may further be configured to perform operation 312. The timing unit 136 is configured to restart timing for the duration in which no data frame of the first service scenario is received, after the receiving unit 135 receives the indication information. For example, with reference to FIG. 12, the timing unit 136 may further be configured to perform operation 313.

Certainly, the service scheduling apparatus 130 provided in this embodiment of this application includes, but is not limited to, the foregoing modules.

In actual implementation, the obtaining unit 131, the determining unit 132, the establishment unit 134, and the timing unit 136 may be implemented by the processor of the service scheduling apparatus shown in FIG. 2. The sending unit 133 and the receiving unit 135 may be implemented by the transceiver circuit of the service scheduling apparatus shown in FIG. 2. For an example execution process, refer to descriptions of the service scheduling method part shown in FIG. 3, FIG. 6, FIG. 9, FIG. 10, or FIG. 12. Details are not described herein again.

Another embodiment of this application further provides a computer-readable storage medium. The computer-readable storage medium stores computer instructions. When the computer instructions are run on a service scheduling apparatus, the service scheduling apparatus is enabled to perform operations performed by the service scheduling apparatus in the method procedure shown in the foregoing method embodiment.

Another embodiment of this application further provides a chip system, and the chip system is applied to a service scheduling apparatus. The chip system includes one or more interface circuits and one or more processors. The interface circuit and the processor are interconnected through lines. The interface circuit is configured to receive a signal from a memory of the service scheduling apparatus, and send a signal to the processor. The signal includes computer instructions stored in the memory. When the processor executes the computer instructions, the service scheduling apparatus performs operations performed by the service scheduling apparatus in the method procedure shown in the foregoing method embodiment.

In another embodiment of this application, a computer program product is further provided. The computer program product includes computer instructions. When the computer instructions are run on a service scheduling apparatus, the service scheduling apparatus is enabled to perform operations performed by the service scheduling apparatus in the method procedure shown in the foregoing method embodiment.

All or a part of the foregoing embodiments may be implemented by software, hardware, firmware, or any combination thereof. When a software program is used to implement the embodiments, all or a part of the embodiments may be implemented in a form of a computer program product. The computer program product includes one or more computer instructions. When the computer-executable instruction instructions are loaded and executed on a computer, the procedure or functions according to embodiments of this application are completely or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid-state drive (SSD), or the like.

The foregoing descriptions are merely embodiments of this application. Any variation or replacement that can be figured out by a person skilled in the art according to the embodiments provided in this application shall fall within the protection scope of this application.

What is claimed is:

1. A service scheduling method, applied to a wireless fidelity (Wi-Fi) network system, the service scheduling method comprising:

obtaining, by a sending node, a waiting delay and a category of each data frame in a plurality of data frames at a current moment, wherein the waiting delay of the data frame is a duration in which the data frame waits for being scheduled by the sending node;

determining, by the sending node, a service priority of each data frame based on the category of each data frame;

determining, by the sending node from the plurality of data frames, a target frame that is preferentially sent at the current moment based on the waiting delay, a preset delay, and the service priority of each data frame, wherein the preset delay of the data frame is a preset upper limit value of a waiting delay, and the preset upper limit value of the waiting delay is less than a communication delay of the data frame; and sending, by the sending node, the target frame to a receiving node at the current moment.

2. The service scheduling method according to claim 1, wherein the determining, by the sending node from the plurality of data frames, a target frame that is preferentially sent at the current moment based on the waiting delay, a preset delay, and the service priority of each data frame comprises:

comparing, by the sending node, a value relationship between the waiting delay of each data frame and the preset delay of the data frame; and determining, by the sending node, the target frame based on a comparison result and the service priority of each data frame.

3. The service scheduling method according to claim 2, wherein the determining, by the sending node, the target frame based on a comparison result and the service priority of each data frame comprises:

determining, by the sending node when determining that the plurality of data frames comprise candidate data frames, that the target frame is a data frame with a highest service priority in the candidate data frames, wherein a waiting delay of the candidate data frame is longer than a preset delay of the candidate data frame.

4. The service scheduling method according to claim 2, wherein the determining, by the sending node, the target frame based on a comparison result and the service priority of each data frame comprises:

determining, by the sending node when determining that the waiting delay of each data frame in the plurality of data frames is less than the preset delay of the data frame, that the target frame is a data frame with a highest service priority and a longest waiting delay in the plurality of data frames.

5. The service scheduling method according to claim 1, wherein the obtaining, by the sending node, a category of each data frame comprises:

determining, by the sending node, the category of each data frame based on the communication delay of each data frame, wherein communication delays of data frames of one category belong to one preset delay range; or determining, by the sending node, a service type of each data frame, and determining the category of each data frame based on the service type of each data frame, wherein data frames of one category have a same service type.

6. The service scheduling method according to claim 1, wherein the service scheduling method further comprises:

determining, by the sending node, a service scenario of each data frame; and performing, by the sending node, the following steps for the service scenario of each data frame:

establishing, by the sending node when determining that stored sessions do not comprise a session of a first service scenario of a first data frame, the session of the first service scenario with the receiving node, wherein the first data frame is any one of the plurality of data frames, and the session of the first service scenario is for the sending node to transmit a data frame of the first service scenario to the receiving node.

7. The service scheduling method according to claim 6, wherein when the sending node is an access point and the receiving node is a station, the service scheduling method further comprises:

sending, by the sending node, scheduling information to the receiving node when determining that duration in which no data frame of the first service scenario is received is longer than a preset delay of the first data frame in the session of the first service scenario, wherein the scheduling information indicates that the receiving node feeds back data information of the first service scenario to the sending node; and receiving, by the sending node, feedback information from the receiving node, wherein the feedback information comprises the data frame of the first service scenario.

8. The service scheduling method according to claim 7, wherein the service scheduling method further comprises:

receiving, by the sending node, indication information from the receiving node, wherein the indication information is sent when determining that duration in which no data frame of the first service scenario is sent is longer than a delay threshold in the session of the first service scenario, and a value of the delay threshold is less than the preset delay of the first data frame; and restarting, by the sending node after receiving the indication information, timing for the duration in which no data frame of the first service scenario is received.

9. A service scheduling apparatus, used in a sending node, wherein the sending node is used in a wireless fidelity (Wi-Fi) network system, and the apparatus comprises:

a processor, configured to obtain a waiting delay and a category of each data frame in a plurality of data frames at a current moment, determine a service priority of each data frame based on the category of each data frame, and determine, from the plurality of data frames, a target frame that is preferentially sent at the current moment based on the waiting delay, a preset delay, and the service priority of each data frame, wherein the waiting delay of the data frame is a duration in which the data frame waits for being scheduled by the processor, the preset delay of the data frame is a preset upper limit value of a waiting delay, and the preset upper limit value of the waiting delay is less than a communication delay of the data frame; and a transmit circuit, configured to send, to a receiving node at the current moment, the target frame determined by the processor.

10. The service scheduling apparatus according to claim 9, wherein the processor is specifically configured to:

compare a value relationship between the waiting delay of each data frame and the preset delay of the data frame; and determine the target frame based on a comparison result and the service priority of each data frame.

11. The service scheduling apparatus according to claim 10, wherein the processor is specifically configured to:

determine, when determining that the plurality of data frames comprise candidate data frames, that the target frame is a data frame with a highest service priority in the candidate data frames, wherein a waiting delay of the candidate data frame is longer than a preset delay of the candidate data frame.

12. The service scheduling apparatus according to claim 10, wherein the processor is specifically configured to:

determine, when determining that the waiting delay of each data frame in the plurality of data frames is less than the preset delay of the data frame, that the target frame is a data frame with a highest service priority and a longest waiting delay in the plurality of data frames.

13. The service scheduling apparatus according to claim 9, wherein the processor is specifically configured to:

determine the category of each data frame based on the communication delay of each data frame, wherein communication delays of data frames of one category belong to one preset delay range; or determine a service type of each data frame, and determine the category of each data frame based on the service type of each data frame, wherein data frames of one category have a same service type.

14. The service scheduling apparatus according to claim 9, wherein the processor is further configured to:

determine a service scenario of each data frame; and perform the following steps for the service scenario of each data frame:

establishing, when determining that stored sessions do not comprise a session of a first service scenario of a first data frame, the session of the first service scenario with the receiving node, wherein the first data frame is any one of the plurality of data frames, and the session of the first service scenario is for transmitting a data frame of the first service scenario to the receiving node.

15. The service scheduling apparatus according to claim 14, wherein when the sending node is an access point and the receiving node is a station, the service scheduling apparatus further comprises a receive circuit, wherein the transmit circuit is further configured to send scheduling information to the receiving node when determining duration in which no data frame of the first service scenario is received is longer than a preset delay of the first data frame in the session of the first service scenario, wherein the scheduling information indicates that the receiving node feeds back data information of the first service scenario to the transmit circuit; and the receive circuit is configured to receive feedback information from the receiving node, wherein the feedback information comprises the data frame of the first service scenario.

16. The service scheduling apparatus according to claim 15, wherein the receive circuit is further configured to receive indication information from the receiving node, wherein the indication information is sent when determining that duration in which no data frame of the first service scenario is sent is longer than a delay threshold in the session of the first service scenario, and a value of the delay threshold is less than the preset delay of the first data frame; and the processor is further configured to restart, after the indication information is received, timing for the duration in which no data frame of the first service scenario is received.

17. A service scheduling apparatus, comprising:

a processor; and a memory coupled to the processor storing computer program code, and the computer program code comprised of computer instructions that, when executed by the processor, cause the service scheduling apparatus to perform operations comprising:

obtaining a waiting delay and a category of each data frame in a plurality of data frames at a current moment;

determining a service priority of each data frame based on the category of each data frame;

determining, from the plurality of data frames, a target frame that is preferentially sent at the current moment based on the waiting delay, a preset delay, and the service priority of each data frame, wherein the waiting delay of the data frame is duration in which the data frame waits for being scheduled by the processor, the preset delay of the data frame is a preset upper limit value of a waiting delay, and the preset upper limit value of the waiting delay is less than a communication delay of the data frame; and sending, to a receiving node at the current moment, the target frame determined by the processor.

18. A computer-readable storage medium, wherein the computer-readable storage medium comprises computer instructions; and when the computer instructions are run on a service scheduling apparatus, the service scheduling apparatus is caused to:

obtain a waiting delay and a category of each data frame in a plurality of data frames at a current moment;

determine a service priority of each data frame based on the category of each data frame;

determine, from the plurality of data frames, a target frame that is preferentially sent at the current moment based on the waiting delay, a preset delay, and the service priority of each data frame, wherein the waiting delay of the data frame is duration in which the data frame waits for being scheduled by the processor, the preset delay of the data frame is a preset upper limit value of a waiting delay, and the preset upper limit value of the waiting delay is less than a communication delay of the data frame; and send, to a receiving node at the current moment, the target frame determined by the processor.

19. The service scheduling apparatus according to claim 17, wherein the determining a target frame that is preferentially sent at the current moment based on the waiting delay, a preset delay, and the service priority of each data frame comprises:

comparing a value relationship between the waiting delay of each data frame and the preset delay of the data frame; and determining the target frame based on a comparison result and the service priority of each data frame.

20. The service scheduling apparatus according to claim 19, wherein the determining the target frame based on a comparison result and the service priority of each data frame comprises:

determining, when determining that the plurality of data frames comprise candidate data frames, that the target frame is a data frame with a highest service priority in the candidate data frames, wherein a waiting delay of the candidate data frame is longer than a preset delay of the candidate data frame.

<div align="center">* * * * *</div>